(12) United States Patent
Nishibe et al.

(10) Patent No.: US 10,104,149 B2
(45) Date of Patent: Oct. 16, 2018

(54) RECEPTION TERMINAL, INFORMATION PROCESSING METHOD, PROGRAM, SERVER, TRANSMISSION TERMINAL, AND INFORMATION PROCESSING SYSTEM

(75) Inventors: Mitsuru Nishibe, Tokyo (JP); Yuya Aoki, Tokyo (JP); Takahiro Okayama, Tokyo (JP); Shunichi Kasahara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 1150 days.

(21) Appl. No.: 13/470,086

(22) Filed: May 11, 2012

(65) Prior Publication Data
US 2012/0297020 A1   Nov. 22, 2012

(30) Foreign Application Priority Data

May 20, 2011   (JP) ................................. 2011-113397

(51) Int. Cl.
*G06F 15/16*   (2006.01)
*H04L 29/08*   (2006.01)

(52) U.S. Cl.
CPC ................................... *H04L 67/00* (2013.01)

(58) Field of Classification Search
CPC ............................... H04L 67/00; G06F 15/16
USPC ....................................................... 709/217
See application file for complete search history.

(56) References Cited

U.S. PATENT DOCUMENTS

| | | | | |
|---|---|---|---|---|
| 7,206,853 B2* | 4/2007 | Eytchison | ........... | H04L 12/2803 709/201 |
| 7,370,289 B1* | 5/2008 | Ebert | ................... | G06F 1/1613 715/704 |
| 7,634,546 B1* | 12/2009 | Strickholm | ............ | G06Q 10/10 709/205 |
| 8,589,495 B1* | 11/2013 | Beckert | ................... | G06F 9/542 709/204 |
| 8,782,033 B2* | 7/2014 | Jiang | ................. | G06F 17/30864 707/710 |
| 2002/0056004 A1* | 5/2002 | Smith | .................... | G06Q 40/04 709/227 |
| 2002/0095312 A1* | 7/2002 | Wheat | ................. | G06F 17/3087 455/412.1 |
| 2005/0063328 A1* | 3/2005 | Dunagan | ............... | H04W 8/245 370/324 |
| 2005/0165743 A1* | 7/2005 | Bharat | ............. | G06F 17/30867 |
| 2005/0273815 A1* | 12/2005 | Orr | ........................ | H04N 5/445 725/45 |
| 2006/0056440 A1* | 3/2006 | Khartabil | ............ | H04L 12/1822 370/447 |
| 2006/0095515 A1* | 5/2006 | Forstadius | ........ | G06F 17/30905 709/205 |

(Continued)

FOREIGN PATENT DOCUMENTS

JP   2009-230579   10/2009

*Primary Examiner* — Anthony Mejia
(74) *Attorney, Agent, or Firm* — Paratus Law Group, PLLC

(57) ABSTRACT

There is provided a reception terminal including a display control section which performs control of displaying content data shared with a transmission terminal, and an acquisition section which acquires, from a server, event identification information for identifying an event occurred in the transmission terminal regarding the content data, wherein the display control section adds a display associated with the event identification information acquired by the acquisition section to the content data.

16 Claims, 14 Drawing Sheets

(56) References Cited

U.S. PATENT DOCUMENTS

| | | | | |
|---|---|---|---|---|
| 2006/0193459 A1* | 8/2006 | Cadiz | H04M 3/42365 | 379/211.02 |
| 2007/0094335 A1* | 4/2007 | Tu | H04L 43/00 | 709/206 |
| 2007/0094389 A1* | 4/2007 | Nussey | H04L 51/12 | 709/225 |
| 2007/0094390 A1* | 4/2007 | Nussey | G06F 17/3089 | 709/225 |
| 2007/0239797 A1* | 10/2007 | Cattell | G06F 17/30306 | |
| 2008/0086456 A1* | 4/2008 | Rasanen | H04N 5/44591 | |
| 2008/0109824 A1* | 5/2008 | Chen | G06F 9/542 | 719/318 |
| 2008/0177741 A1* | 7/2008 | Joshi | G06F 17/30557 | |
| 2009/0006075 A1* | 1/2009 | Krishnan S | G06F 17/30681 | 704/2 |
| 2009/0019107 A1* | 1/2009 | Lance | G06Q 10/00 | 709/203 |
| 2009/0077224 A1* | 3/2009 | Appleton | H04L 41/0609 | 709/224 |
| 2009/0187609 A1* | 7/2009 | Barton | G06F 11/1464 | |
| 2009/0254856 A1* | 10/2009 | Cwajbaum | G06F 17/30899 | 715/808 |
| 2009/0299940 A1* | 12/2009 | Hayes | G06N 5/025 | 706/47 |
| 2009/0307376 A1* | 12/2009 | McCarthy | G06F 15/16 | 709/248 |
| 2009/0319484 A1* | 12/2009 | Golbandi | G06F 17/30864 | |
| 2009/0319917 A1* | 12/2009 | Fuchs | G06Q 10/107 | 715/753 |
| 2009/0328177 A1* | 12/2009 | Frey | H04L 9/3213 | 726/9 |
| 2010/0169778 A1* | 7/2010 | Mundy | G06F 17/30905 | 715/716 |
| 2010/0179915 A1* | 7/2010 | Nastacio | G06Q 30/02 | 705/319 |
| 2010/0235758 A1* | 9/2010 | Shen | H04L 51/04 | 715/752 |
| 2010/0241964 A1* | 9/2010 | Belinsky | G06F 17/3089 | 715/738 |
| 2011/0208589 A1* | 8/2011 | Garg | G06F 3/0482 | 705/14.58 |
| 2011/0218955 A1* | 9/2011 | Tang | G06F 15/16 | 706/52 |
| 2011/0251942 A1* | 10/2011 | Rosenthal | G06Q 40/04 | 705/37 |
| 2011/0270931 A1* | 11/2011 | Cheng | H04L 51/24 | 709/206 |
| 2011/0276372 A1* | 11/2011 | Spivack | G06Q 10/109 | 705/14.5 |
| 2011/0289172 A1* | 11/2011 | Marcellino | H04L 51/24 | 709/206 |
| 2012/0151383 A1* | 6/2012 | Kazan | G06Q 10/101 | 715/753 |
| 2012/0244500 A1* | 9/2012 | Marinescu | G06Q 10/06398 | 434/107 |
| 2012/0254348 A1* | 10/2012 | Chaturvedi | H04L 67/1097 | 709/217 |
| 2012/0297020 A1* | 11/2012 | Nishibe | H04L 67/00 | 709/217 |
| 2013/0309648 A1* | 11/2013 | Park | G09B 5/00 | 434/350 |
| 2014/0047020 A1* | 2/2014 | Matus | H04L 67/306 | 709/204 |
| 2014/0358632 A1* | 12/2014 | Graff | G06F 17/3087 | 705/7.29 |

* cited by examiner

RECEPTION TERMINAL, INFORMATION PROCESSING METHOD, PROGRAM, SERVER, TRANSMISSION TERMINAL, AND INFORMATION PROCESSING SYSTEM

BACKGROUND

The present disclosure relates to a reception terminal, an information processing method, a program, a server, a transmission terminal, and an information processing system.

In recent years, there has been developed technology of sharing a screen provided by a server through a network between multiple terminals (for example, refer to JP 2009-230579A). With the use of the technology, users using the respective multiple terminals can conduct a meeting smoothly while viewing the same screen displayed on the respective multiple terminals. Further, for example, when an operation of specifying a notable part within the screen is shared between the multiple terminals, the meeting can be conducted further smoothly.

On the other hand, with the spread of the Internet, technology of sharing content data such as a Web page provided by a Web server between multiple terminals is used in many scenes. Also in the case of sharing the content data, the content data provided by the server can be displayed by each of the multiple terminals in the same manner as in the above-mentioned case of sharing the screen. In this way, the users using the respective multiple terminals can view the same content data displayed by each of the multiple terminals.

SUMMARY

However, in the case of sharing content data between multiple terminals, there is a case where it is not desirable to directly reflect an event (for example, transition to content data specified by a user) occurred in one terminal on another terminal. This is because there is also a case where the users using the respective multiple terminals want to view content data with their free operation, when using the content data privately, for example.

Even in this case, under the case where content data is being shared between the multiple terminals, it is desirable to notify another terminal of the event occurred in one terminal, thereby notifying another user viewing the content data of what operation one user is performing to the content data.

According to an embodiment of the present disclosure, there is provided a reception terminal which includes a display control section which performs control of displaying content data shared with a transmission terminal, and an acquisition section which acquires, from a server, event identification information for identifying an event occurred in the transmission terminal regarding the content data, wherein the display control section adds a display associated with the event identification information acquired by the acquisition section to the content data.

According to the embodiment of the present disclosure described above, under the case where content data is being shared between the multiple terminals, it is possible to notify another user viewing the content data of what operation one user is performing to the content data.

DETAILED DESCRIPTION OF THE EMBODIMENT(S)

Figure 1:
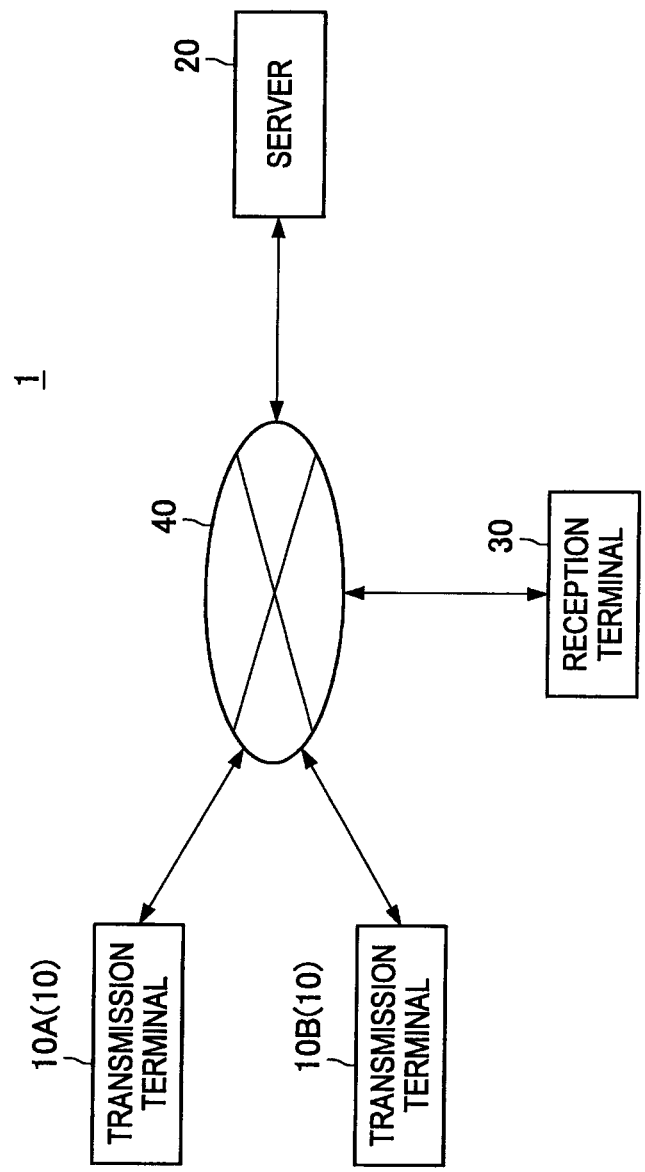
FIG. 1 is a diagram showing a configuration of an information processing system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the appended drawings, there are some cases where multiple structural elements that have substantially the same function and structure are distinguished from one another by being denoted with different alphabets after the same reference numerals. For example, the multiple structural elements that have substantially the same function and structure are distinguished from one another as necessary, like a transmission terminal 10A and a transmission terminal 10B. Note that, in the case where it is not necessary to distinguish the multiple structural elements that have substantially the same function and structure from one another, the multiple structural elements are denoted with the same reference numeral only. For example, in the case where it is not particularly necessary to distinguish the transmission terminal 10A and the transmission terminal 10B from one another, they are each simply referred to as transmission terminal 10.

Note that the description will be given in the following order.

1. Configuration of information processing system
2. Functions of transmission terminal
3. Functions of server 4. Functions of reception terminal
5. Example of hardware configuration
6. Conclusion

1. CONFIGURATION OF INFORMATION PROCESSING SYSTEM

Hereinafter, with reference to FIGS. 1 to 14, an embodiment according to the present disclosure will be described in detail. First, a configuration of an information processing system according to the embodiment of the present disclosure will be described.

FIG. 1 is a diagram showing a configuration of an information processing system according to an embodiment of the present disclosure. As shown in FIG. 1, an information processing system 1 includes a transmission terminal 10, a server 20, and a reception terminal 30. The transmission terminal 10, the server 20, and the reception terminal 30 are capable of communicating with each other via a network 40.

The network 40 is a wired or wireless transmission path for information transmitted from an apparatus connected to the network 40. For example, the network 40 may include a public line network such as the Internet, a telephone line network, and a satellite communication network, and a leased line network such as various types of LAN (Local Area Network), including Ethernet (registered trademark), WAN (Wide Area Network), and IP-VPN (Internet Protocol-Virtual Private Network).

The transmission terminal 10 performs control of displaying content data shared with the reception terminal 30. In this way, the user using the transmission terminal 10 can view the content data displayed by the control performed by the transmission terminal 10. The content data shared with the reception terminal 30 is held by the server 20, for example, and when the transmission terminal 10 transmits a request to the server 20, the transmission terminal 10 can acquire the content data as a response to the request. The content data shared with the reception terminal 30 may be held by a device other than the server 20.

While viewing the thus displayed content data, the user can perform operation to the content data. As the operation performed to the content data, there can be assumed a transition to the content data specified by the user, for example, but the operation is not particularly limited. When the operation is performed by the user, the operation is detected by the transmission terminal 10 as an event. The transmission terminal 10 can notify the server 20 of event identification information for identifying the detected event.

It should be noted that, although FIG. 1 shows the example in which the information processing system 1 includes two transmission terminals 10 (transmission terminal 10A and transmission terminal 10B), the number of the transmission terminals 10 is not particularly limited. That is, the information processing system 1 may include one transmission terminal 10, or two or more transmission terminals 10.

The server 20 acquires the event identification information from the transmission terminal 10. The server 20 can hold the event identification information acquired from the transmission terminal 10. The reception terminal 30 can be notified of the thus held event identification information in response to the request from the reception terminal 30. It should be noted that although FIG. 1 shows a case in which the server 20 is a different device from the transmission terminal 10 or the reception terminal 30, the server 20 may be embedded in the transmission terminal 10, or may be embedded in the reception terminal 30.

The reception terminal 30 performs control of displaying content data shared with the transmission terminal 10. In this way, the user using the reception terminal 30 can view the content data displayed by the control performed by the reception terminal 30. The content data shared with the transmission terminal 10 is held by the server 20 as described above, for example, and when the reception terminal 30 transmits a request to the server 20, the reception terminal 30 can acquire the content data as a response to the request.

When receiving the event identification information from the server 20, the reception terminal 30 can add a display associated with the acquired event identification information to the content data. The user using the reception terminal 30 views the display added to the content data in this way, and thus, the user can grasp the operation performed by another user to the content data. As a result thereof, the user using the reception terminal 30 can use the grasped operation as a reference when the user himself/herself is performing operation to the viewing content data, for example.

The transmission terminal 10 and the reception terminal 30 may each be an information processing apparatus such as a PC (Personal Computer), a video processing apparatus for home use (such as a DVD recorder and a video cassette recorder), a mobile phone, a PHS (Personal Handyphone System), a mobile music playback device, a mobile video processing device, a PDA (Personal Digital Assistant), a home game console, a mobile game console, and a consumer electronics device.

Hereinafter, there will be described an example in which the transmission terminal 10 has a function of detecting an event that occurred regarding the content data, a function of notifying the server 20 of event identification information, a function of executing and controlling the event, and the like. Further, there will be described an example in which the reception terminal 30 has a function of receiving the event identification information from the server 20, a function of adding a display associated with the event identification information to the content data, and the like.

However, the transmission terminal 10 may additionally be provided with a part or all of the functions of the reception terminal 30. Further, the reception terminal 30 may additionally be provided with a part or all of the functions of the transmission terminal 10. Hereinafter, configurations of the transmission terminal 10, the server 20, and the reception terminal 30 according to the embodiment of the present disclosure will each be described.

2. FUNCTIONS OF TRANSMISSION TERMINAL

Figure 2:
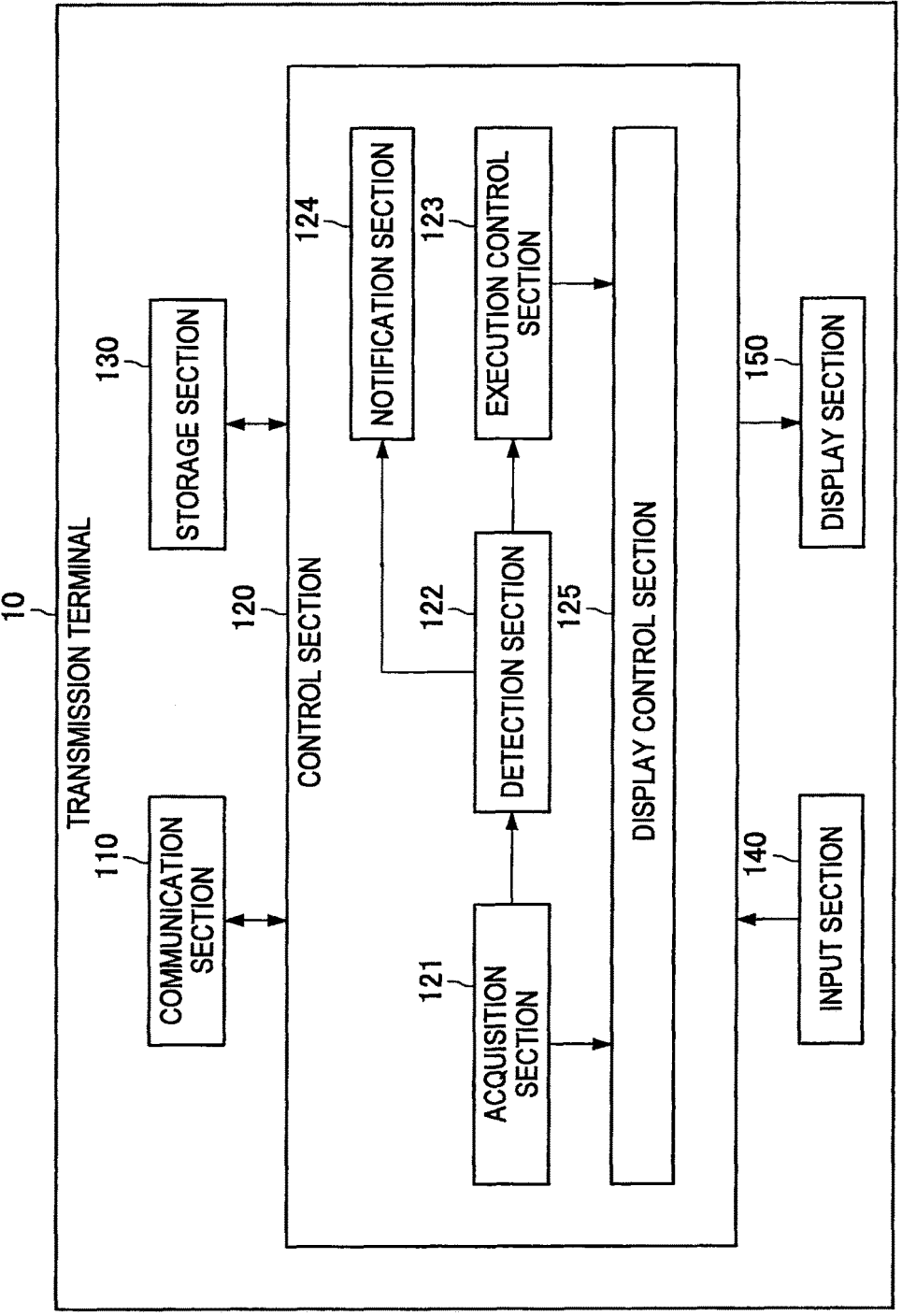
FIG. 2 is a block diagram showing a functional configuration of a transmission terminal according to the embodiment.

First, functions of the transmission terminal 10 according to the embodiment of the present disclosure will be described. FIG. 2 is a block diagram showing a functional configuration of the transmission terminal 10 according to the embodiment of the present disclosure. As shown in FIG. 2, the transmission terminal 10 according to the embodiment of the present disclosure includes a communication section 110, a control section 120, a storage section 130, an input section 140, and a display section 150.

The communication section 110 has a function of communicating with the server 20 via the network 40. For example, in the case where an event that occurred regarding the content data which is shared with the reception terminal 30 is detected, the communication section 110 can function as a transmission section which transmits event identification information for identifying the event. Further, the communication section 110 can function as a reception section which receives content data and receives control information from the server 20 or from a device other than the server 20.

The control section 120 is configured from, for example, a CPU (Central Processing Unit), a ROM (Read Only Memory), and a RAM (Random Access Memory), and has a function of controlling an entire operation of the transmission terminal 10. The control section 120 includes an acquisition section 121, a detection section 122, an execution control section 123, a notification section 124, and a display control section 125.

The acquisition section 121 acquires content data shared with the reception terminal 30. The acquisition section 121 can acquire the content data received by the communication section 110 from the server 20 or a device other than the server 20, for example. For example, the content data is acquired by the acquisition section 121 based on a URL (Uniform Resource Locator) or the like, which is input by the user using the input section 140, the input being accepted.

Figure 3:
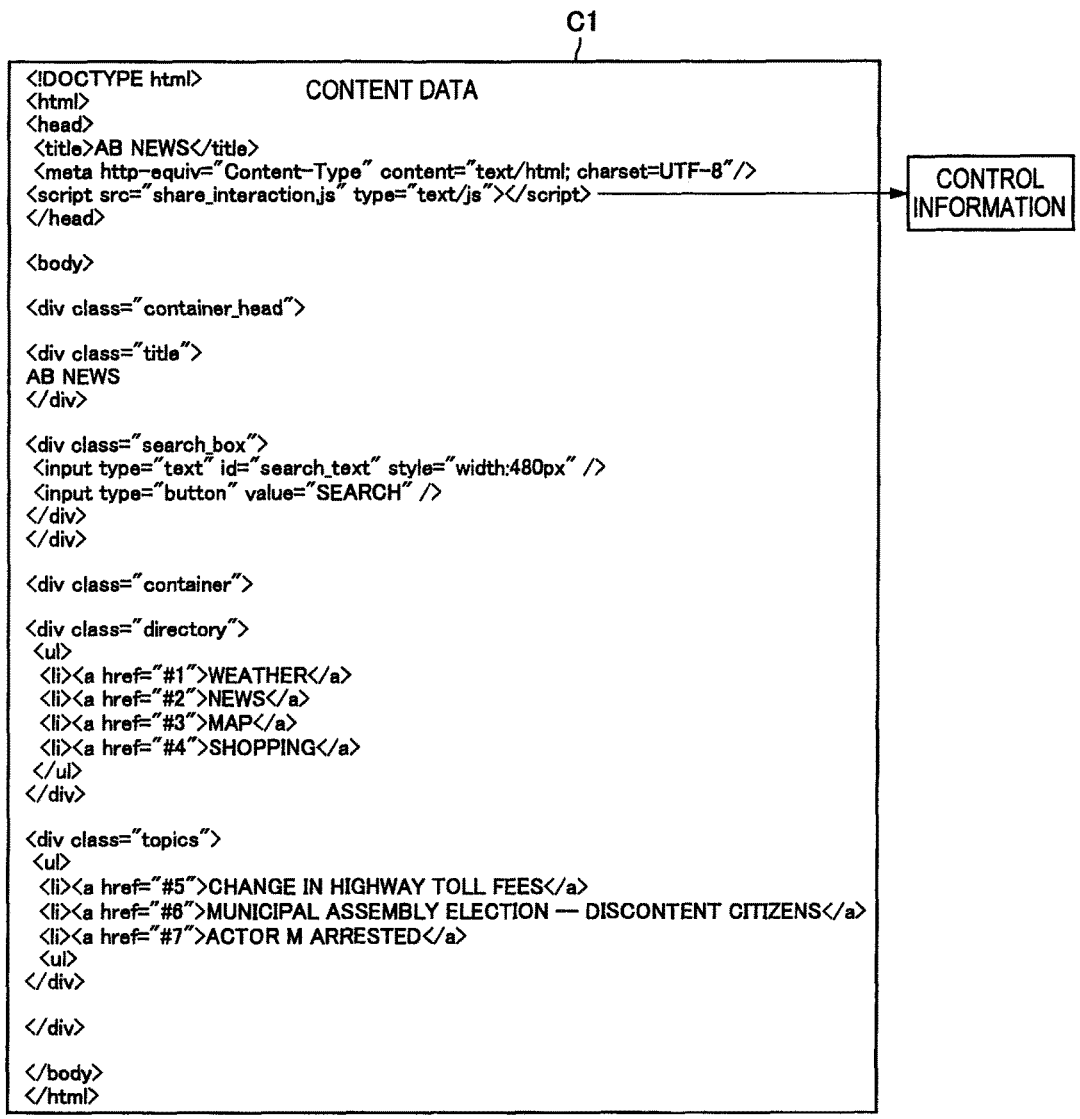
FIG. 3 is a diagram showing an example of content data according to the embodiment.

FIG. 3 is a diagram showing an example of content data according to the embodiment of the present disclosure. For example, the acquisition section 121 can acquire content data C1 as shown in FIG. 3. Although the content data shown in FIG. 3 is provided in HTML (HyperText Markup Language) format, the format of the content data is not particularly limited. As shown in FIG. 3, an address indicating the location of control information may be embedded in the content data C1.

The control information corresponds to a program for controlling a function of transmitting event identification information by the transmission terminal 10, a function of receiving the event identification information by the reception terminal 30, a function of adding a display associated with the event identification information to the content data by the reception terminal 30, and the like. The control information is acquired by the acquisition section 121, for example, based on the address embedded in the content data C1. The control information may be held by the server 20, may be held by a device other than the server 20, or may be held by the transmission terminal 10 or the reception terminal 30. If the transmission terminal 10 or the reception terminal 30 holds the control information, the control information can be synchronized between the transmission terminal 10 and the reception terminal 30 even in the case where the content data is used which is given by a server that does not support the synchronization processing between the transmission terminal 10 and the reception terminal 30. However, it is necessary that a synchronization server be prepared which is accessed by the control information held by the transmission terminal 10 or the reception terminal 30.

Figure 4:
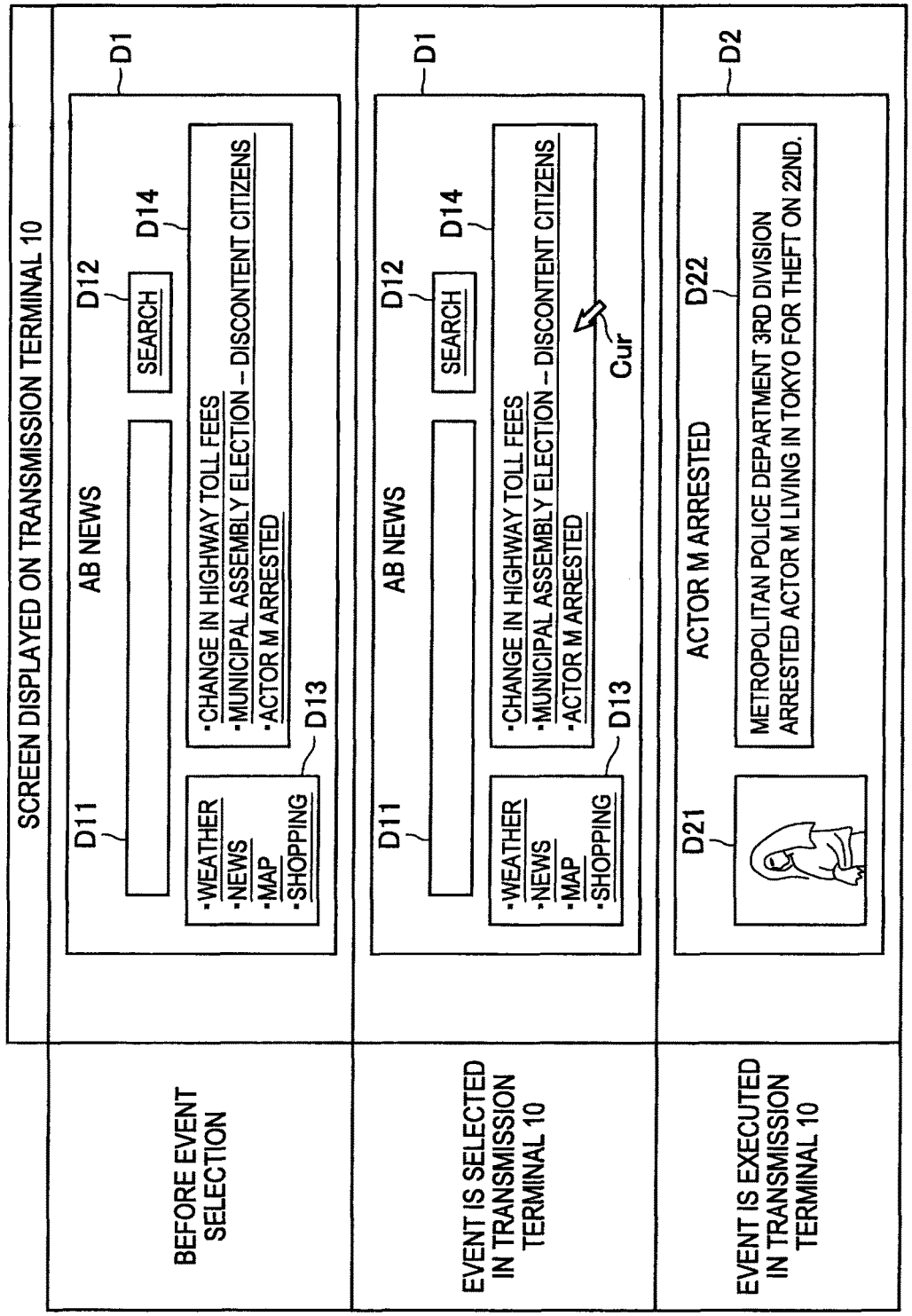
FIG. 4 is a diagram showing an example of a screen displayed by the transmission terminal according to the embodiment.

The display control section 125 performs control of displaying content data shared with the reception terminal 30. FIG. 4 is a diagram showing an example of a screen displayed by the transmission terminal 10 according to the embodiment of the present disclosure. In the example shown in FIG. 4, the content data C1 is displayed as a screen D1 on the display section 150 by the control performed by the display control section 125, "before event selection". The screen D1 includes a text area D11, a search button D12, a link group D13, a link group D14, and the like.

When an event is selected by the user, the detection section 122 detects an occurrence of the selected event. For example, a cursor Cur is moved by the display control section 125 based on the movement operation, which is input by the user using the input section 140, the input being accepted, and after that, the event at the position of the cursor Cur is selected based on a determination operation input by the input section 140. In the example shown in FIG. 4, a transition event to content data having a name of "Actor M arrested" is selected.

The detection section 122 detects an event that occurred regarding the content data. In the example shown in FIG. 4, the transition event to content data having the name of "Actor M arrested" is selected, and the detection section 122 detects the occurrence of the transition event to the content data. The event the occurrence of which is detected by the detection section 122 is not particularly limited. For example, the detection section 122 may in advance hook an element (for example, anchor element and input element) corresponding to the event the occurrence of which is to be detected from the content data, and may detect the occurrence of the hooked event, or the detection section 122 may detect the occurrence of all events that can be assumed.

The detection section 122 can detect the occurrence of events such as completion of content data loading, returning to the previous content data, jumping to content data of a link destination, editing of a form, clicking, screen scrolling, operation for activating an element in content data, and moving a cursor. The detection section 122 can also detect the following: as for an event (for example, transition event to content data having the name of "Actor M arrested") that occurs for each element in the content data, which of the elements the event is related to.

The execution control section 123 controls execution of the event, the occurrence of which is detected by the detection section 122. For example, in the case where the occurrence of the transition event to the content data having the name of "Actor M arrested" is detected by the detection section 122, the execution control section 123 performs control of executing transition to the content data.

In more detail, the execution control section 123 acquires the content data having the name of "Actor M arrested", and outputs the acquired content data to the display control section 125. The display control section 125 performs control of displaying the content data output from the execution control section 123 on the display section 150. In the example shown in FIG. 4, the display control section 125 performs control of displaying the content data after transition as a screen D2. The screen D2 includes an image D21, a text D22, and the like.

The notification section 124 notifies the server 20 of event identification information for identifying the event detected by the detection section 122. For example, the notification section 124 controls the communication section 110 to transmit the event identification information for identifying the event detected by the detection section 122 to the server 20. The notification section 124 may use any information as the event identification information.

For example, the notification section 124 may use the whole or a part of the tag corresponding to the event whose occurrence is detected as the event identification information, or may convert the whole or a part of the tag into a hash value and may use the hash value obtained by the conversion as the event identification information. Further, in the case where an identifier (id) for uniquely identifying the tag is embedded in the tag, the identifier may be used as the event identification information. The notification section 124 may associate the event identification information with the tag corresponding to the event whose occurrence is detected.

The timing at which the event identification information is transmitted is not particularly limited. For example, in the case where there is a sufficient band of the network 40, the notification section 124 may notify the server 20 of the event identification information every time the event occurs in the transmission terminal 10. Further, for example, in the case where there is a sufficient band of the network 40, the notification section 124 may notify the server 20 of one or more pieces of event identification information collectively every predetermined time period. Further, in the information processing system 1 according to the embodiment of the present disclosure, it is difficult for the user to notice delay even when the delay is large, unlike the synchronization in general screens. Accordingly, the transmission intervals may be increased. For example, one or more events occurred in one minute may be transmitted collectively to the server 20 from the transmission terminal 10.

The notification section 124 may notify the server 20 of information related to an event in addition to the event identification information. For example, the notification section 124 may notify the server 20 of information (for example, a URL and the like of content data) for identifying content data in addition to the event identification information. Further, the notification section 124 may notify the server 20 of data entered by a user into a text area or the like, in addition to the event identification information.

The transmission terminal 10 may further notify the server 20 of event occurrence time, which is time at which an event occurred. In more detail, the detection section 122 further detects the event occurrence time, and the notification section 124 notifies the server 20 of the event occurrence time detected by the detection section 122 in addition to the event identification information. The detection section 122 can acquire the event occurrence time from a clock which is provided inside or outside of the transmission terminal 10, for example. The time to be a reference to the event occurrence time is not limited, and may be set to the time after the elapse of a predetermined time period (for example, after the elapse of 10 seconds) from the completion of the loading of the content data.

As described above, as the information which the server 20 is notified of by the notification section 124, there are assumed the event identification information, the information related to an event, and the like, and the server 20 may be notified of those pieces of information without any limitation or the server 20 may be notified of those pieces of information when a predetermined condition is satisfied. That is, the detection section 122 may further detect whether to limit the notification of the information related to the event whose occurrence is detected with respect to the reception terminal 30. In this case, when the detection section 122 detects that the notification of the information related to the event is to be limited with respect to the reception terminal 30, the notification section 124 may limit the notification of the information related to the event with respect to the server 20.

For example, the detection section 122 may determine that the notification with respect to the reception terminal 30 of a character string set in a form which is expected to have private information entered therein is to be limited. For example, an "input" tag, a "textarea" tag, an editable "div", and the like each correspond to the form which is expected to have the private information therein. For example, the detection section 122 may determine that the reception terminal 30 is not to be notified of the character string set in the form which is expected to have the private information entered therein. In this case, the notification section 124 may limit the notification of the character string set in the form which is expected to have the private information entered therein with respect to the server 20. For example, the notification section 124 may not notify the server 20 of the character string set in the form which is expected to have the private information entered therein.

For example, the detection section 122 may determine that the notification with respect to the reception terminal 30 of the character string set in the form within content data for SSL (Secure Socket Layer) communication is to be limited. For example, since it is necessary to perform SSL communication in a login screen in many cases, the detection section 122 may determine that the reception terminal 30 is not to be notified of the character string set in the login screen. In this case, the notification section 124 may limit the notification of the character string set in the login screen with respect to the server 20. For example, the notification section 124 may not notify the server 20 of the character string set in the login screen.

Further, an administrator of content data or the like may assign a class, which indicates that the notification with respect to the reception terminal 30 is permitted, to an element whose notification with respect to the reception terminal 30 is permitted. In this case, the detection section 122 may determine that the reception terminal 30 is to be notified of an element, the element not being assigned with the class indicating that the notification with respect to the reception terminal 30 is permitted. For example, the detection section 122 may determine that the reception terminal 30 is not to be notified of the element, the element not being assigned with the class indicating that the notification with respect to the reception terminal 30 is permitted. In this case, the notification section 124 may limit the notification of the element with respect to the server 20, the element not being assigned with the class indicating that the notification with respect to the reception terminal 30 is permitted. For example, the notification section 124 may not notify the server 20 of the element, the element not being assigned with the class indicating that the notification with respect to the reception terminal 30 is permitted.

As described above, in the case where it is detected that something whose notification with respect to the reception terminal 30 is to be limited, the notification of information related to an event with respect to the server 20 may be limited, and in this case, the information related to the event may be abstracted by the notification section 124 and the notification section 124 may notify the server 20 of the information related to the event. For example, the notification section 124 may notify the server 20 of only the fact that there is a key entry, only the number of characters of the entered character string, only the change in a cursor position, or only the fact that there is a change in the entire form.

The storage section 130 is configured from a magnetic storage device such as an HDD (Hard Disk Drive), a semiconductor storage device, an optical storage device, or a magneto-optical storage device, for example, and stores various types of information and various programs. The storage section 130 is also capable of storing content data and control information based on control performed by the control section 120, for example.

The input section 140 has a function of accepting input of various types of operations from a user. For example, the input section 140 can accept from the user an input of the URL of the content data to be acquired. Further, the input section 140 can accept from the user an input of a movement operation for moving a cursor Cur. Further, the input section 140 can accept from the user an input of a determination operation for causing the event at the position of the cursor Cur to be selected.

The display section 150 has a function of displaying various types of information based on the control performed by the display control section 125. For example, the display section 150 can display content data based on the control performed by the display control section 125. Further, for example, the display section 150 can display the cursor Cur based on the control performed by the display control section 125.

Figure 5:
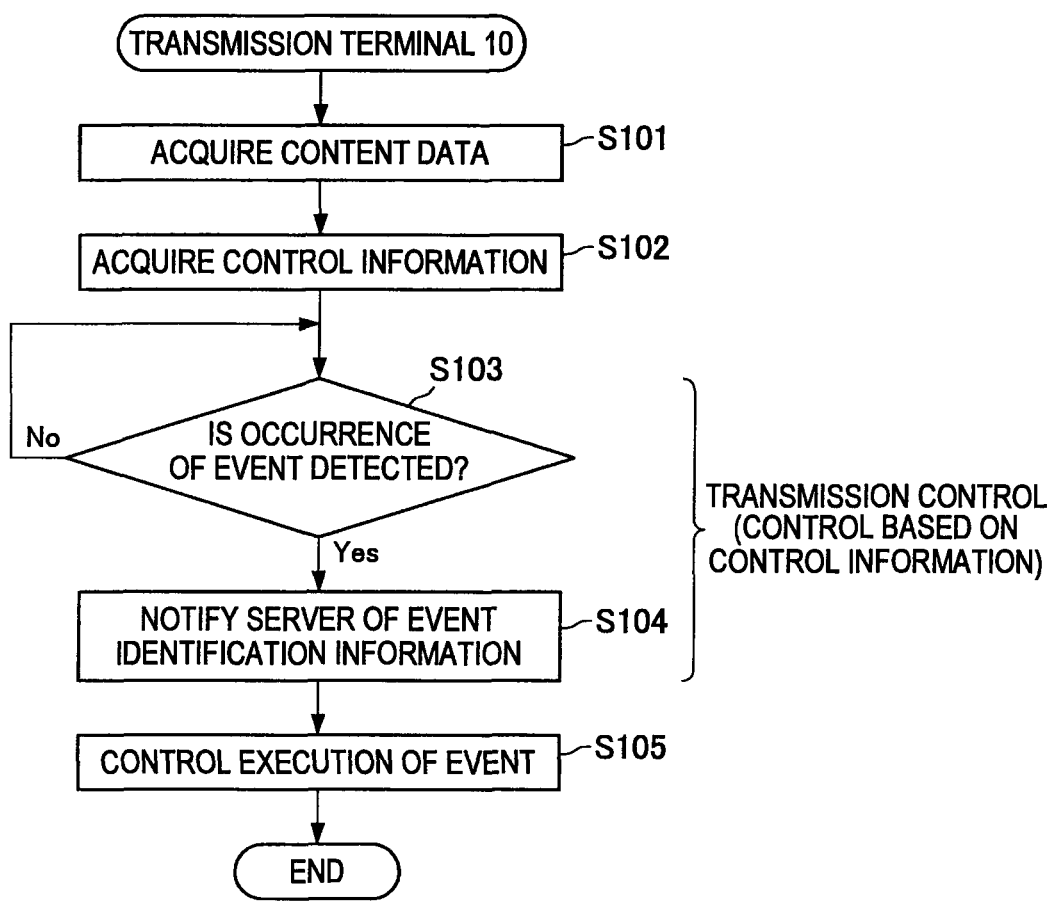
FIG. 5 is a flowchart showing a flow of operation performed by the transmission terminal according to the embodiment.

Subsequently, a flow of operation performed by the transmission terminal 10 according to the embodiment of the present disclosure will be described. FIG. 5 is a flowchart showing a flow of operation performed by the transmission terminal 10 according to the embodiment of the present disclosure. As shown in FIG. 5, first, the acquisition section 121 acquires content data (Step S101), and acquires control information (Step S102).

In the case where the detection section 122 detects an occurrence of an event ("Yes" in Step S103), the notification section 124 notifies the server 20 of event identification information (Step S104), and the execution control section 123 controls the execution of the event (Step S105). In the case where the detection section 122 does not detect the occurrence of the event ("No" in Step S103), the processing returns to Step S103. Steps S103 to S105 are executed based on the above-mentioned control information, for example.

3. FUNCTIONS OF SERVER

Figure 6:
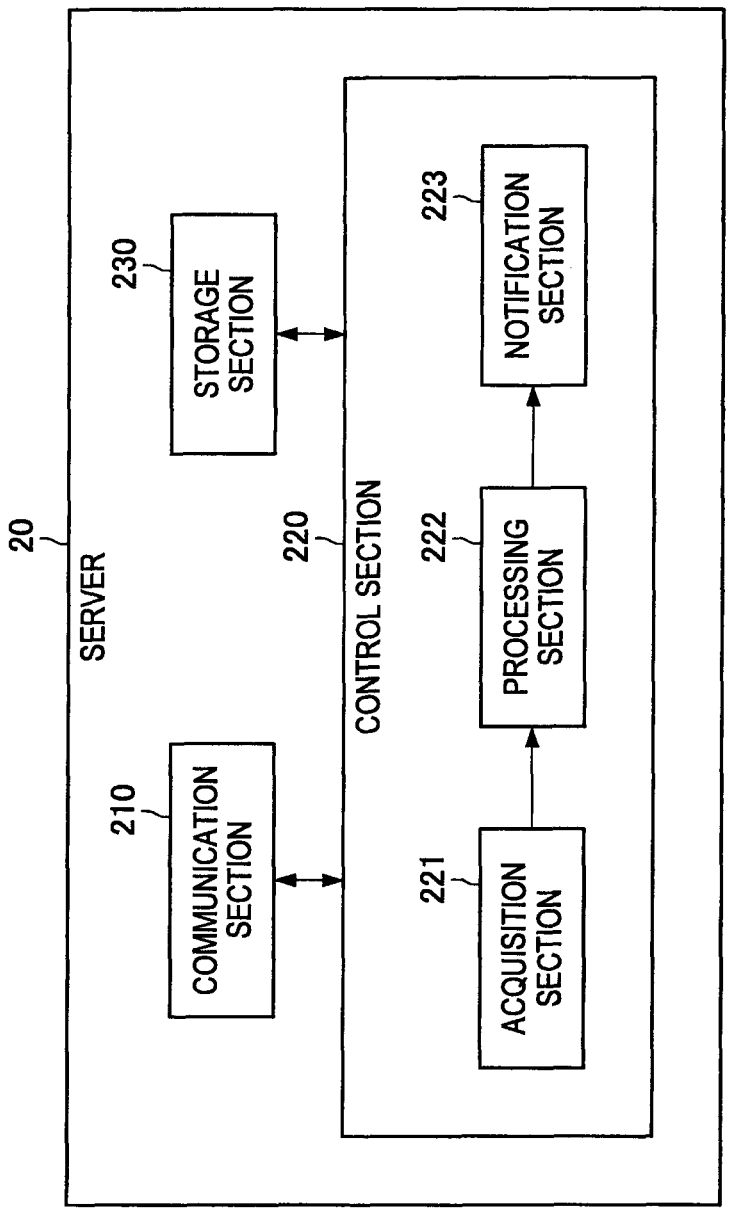
FIG. 6 is a block diagram showing a functional configuration of a server according to the embodiment.

Subsequently, functions of the server 20 according to the embodiment of the present disclosure will be described. FIG. 6 is a block diagram showing a functional configuration of the server 20 according to the embodiment of the present disclosure. As shown in FIG. 6, the server 20 according to the embodiment of the present disclosure includes a communication section 210, a control section 220, and a storage section 230.

The communication section 210 has a function of communicating with the transmission terminal 10 and the reception terminal 30 via the network 40. The communication section 210 can function as a reception section which receives, from the transmission terminal 10, event identification information for identifying an event occurred in the transmission terminal 10 regarding content data shared between the transmission terminal 10 and the reception terminal 30, for example. Further, the communication section 210 can function as a transmission section which transmits the event identification information to the reception terminal 30.

The control section 220 is configured from, for example, a CPU (Central Processing Unit), a ROM (Read Only Memory), and a RAM (Random Access Memory), and has a function of controlling an entire operation of the server 20. The control section 220 includes an acquisition section 221, a processing section 222, and a notification section 223.

The acquisition section 221 acquires, from the transmission terminal 10, the event identification information for identifying the event occurred in the transmission terminal 10 regarding the content data shared between the transmission terminal 10 and the reception terminal 30. For example, the acquisition section 221 can acquire the event identification information received from the transmission terminal 10 by the communication section 210. The event identification information acquired by the acquisition section 221 can be stored in the storage section 230 by the processing section 222.

The notification section 223 notifies the reception terminal 30 of the event identification information acquired by the acquisition section 221 in response to a request (hereinafter, also referred to as "event notification request") from the reception terminal 30. For example, the notification section 223 can acquire the event notification request received from the reception terminal 30 by the communication section 210. The notification section 223 can notify the reception terminal 30 of the event identification information stored in the storage section 230, for example.

In the case where the notification of information related to an event in addition to the event identification information is performed by the transmission terminal 10, the notification section 223 may notify the reception terminal 30 of the information related to the event in addition to the event identification information.

In the case where the transmission terminal 10 further notifies the server 20 of the event occurrence time, the server 20 may further notify the reception terminal 30 of the event occurrence time. In more detail, the acquisition section 221 further detects the event occurrence time from the transmission terminal 10, and the notification section 223 notifies the reception terminal 30 of the event occurrence time acquired by the acquisition section 221 in addition to the event identification information.

Figure 7:
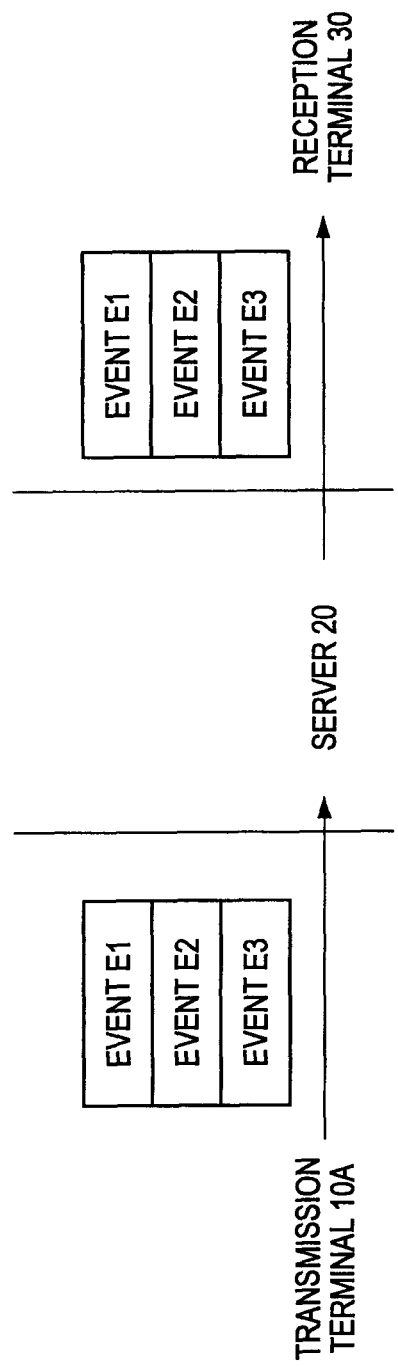
FIG. 7 is a diagram illustrating an example of processing executed by the server according to the embodiment.

FIG. 7 is a diagram illustrating an example of processing executed by the server according to the embodiment of the present disclosure. As shown in FIG. 7, in the case where the notification of pieces of event identification information (events E1, E2, and E3) is performed from the transmission terminal 10A serving as an example of the transmission terminal 10, the acquisition section 221 of the server 20 can acquire the pieces of event identification information (events E1, E2, and E3), and the notification section 223 can notify the reception terminal 30 of the pieces of event identification information (events E1, E2, and E3) acquired by the acquisition section 221.

The storage section 230 is configured from a magnetic storage device such as an HDD (Hard Disk Drive), a semiconductor storage device, an optical storage device, or a magneto-optical storage device, for example, and stores various types of information and various programs. The storage section 230 is also capable of storing the event identification information and the event occurrence time based on the control performed by the control section 220, for example.

Figure 8:
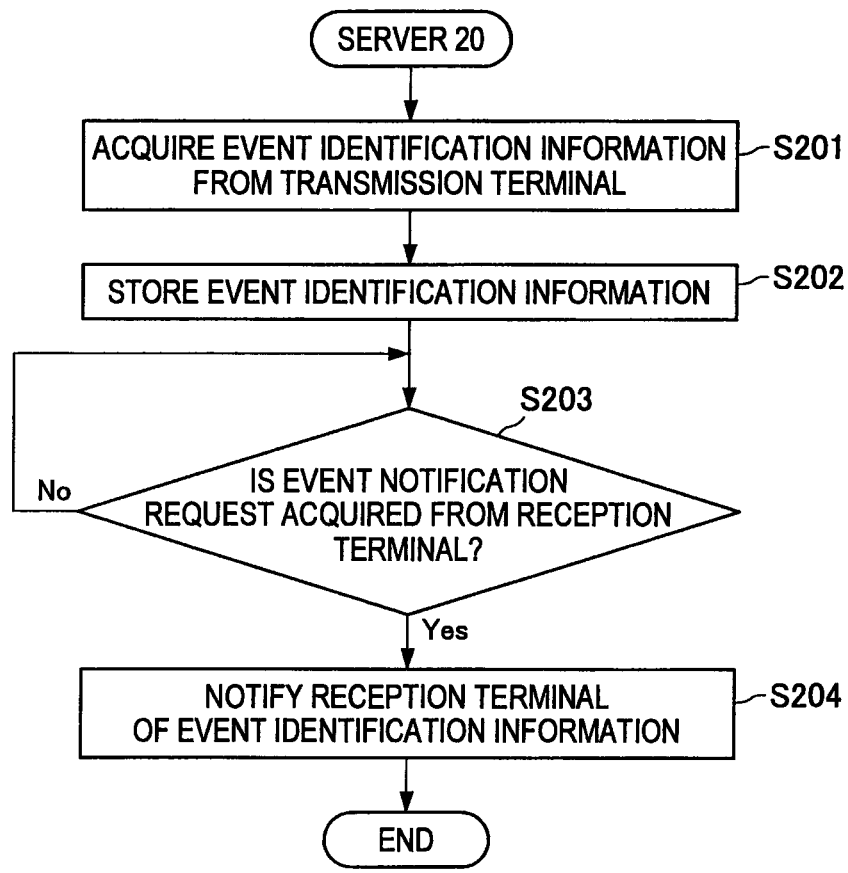
FIG. 8 is a flowchart showing a flow of operation performed by the server according to the embodiment.

Subsequently, a flow of operation performed by the server 20 according to the embodiment of the present disclosure will be described. FIG. 8 is a flowchart showing a flow of operation performed by the server 20 according to the embodiment of the present disclosure. As shown in FIG. 8, first, the acquisition section 221 acquires the event identification information from the transmission terminal 10 (Step S201), and the storage section 230 stores the event identification information acquired by the acquisition section 221 (Step S202).

In the case where the notification section 223 acquires the event notification request from the reception terminal 30 ("Yes" in Step S203), the notification section 223 notifies the reception terminal 30 of the event identification information (Step S204). In the case where the notification section 223 does not acquire the event notification request from the reception terminal 30 ("No" in Step S203), the processing returns to Step S203.

Figure 9:
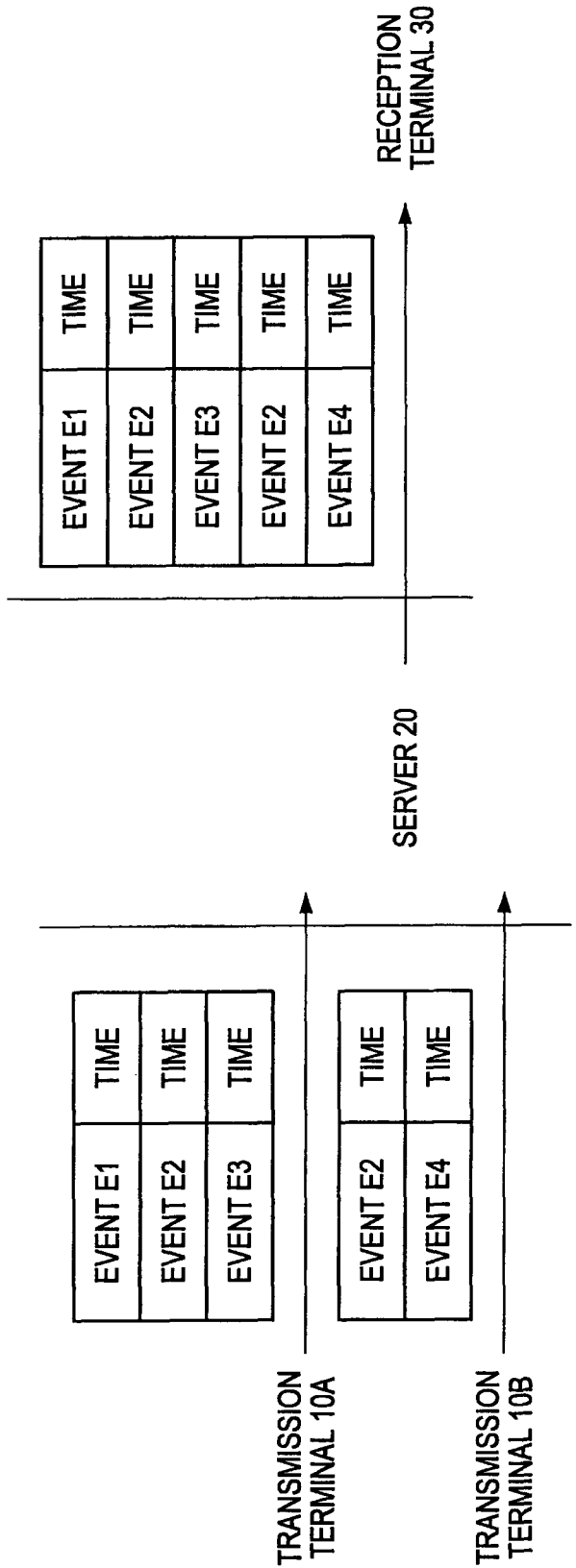
FIG. 9 is a diagram illustrating another example of processing executed by the server according to the embodiment.

FIG. 9 is a diagram illustrating another example of processing executed by the server according to the embodiment of the present disclosure. As shown in FIG. 9, there can be assumed the case where the notification of pieces of event identification information (events E1, E2, and E3) and event occurrence times associated with the respective pieces of event identification information is performed by the transmission terminal 10A serving as an example of the transmission terminal 10, and the notification of pieces of event identification information (events E2 and E4) and event occurrence times associated with the respective pieces of event identification information is performed by the transmission terminal 10B serving as an example of the transmission terminal 10. In this case, the processing section 222 can merge the combinations acquired from the transmission terminal 10A with the combinations acquired from the transmission terminal 10B, and the notification section 223 can notify the reception terminal 30 of the result obtained by the merging.

In the example shown in FIG. 9, although the processing section 222 puts together a plurality of combinations in one time-series, the processing section 222 may also put together a plurality of identical pieces of event identification information into one in order to reduce the band of the network 40. Alternatively, the processing section 222 may perform the processing of deleting event identification information having low priority order, which is set in advance. Further, events of going in and out of the content data may be collectively set as an event of current number of visitors.

Figure 10:
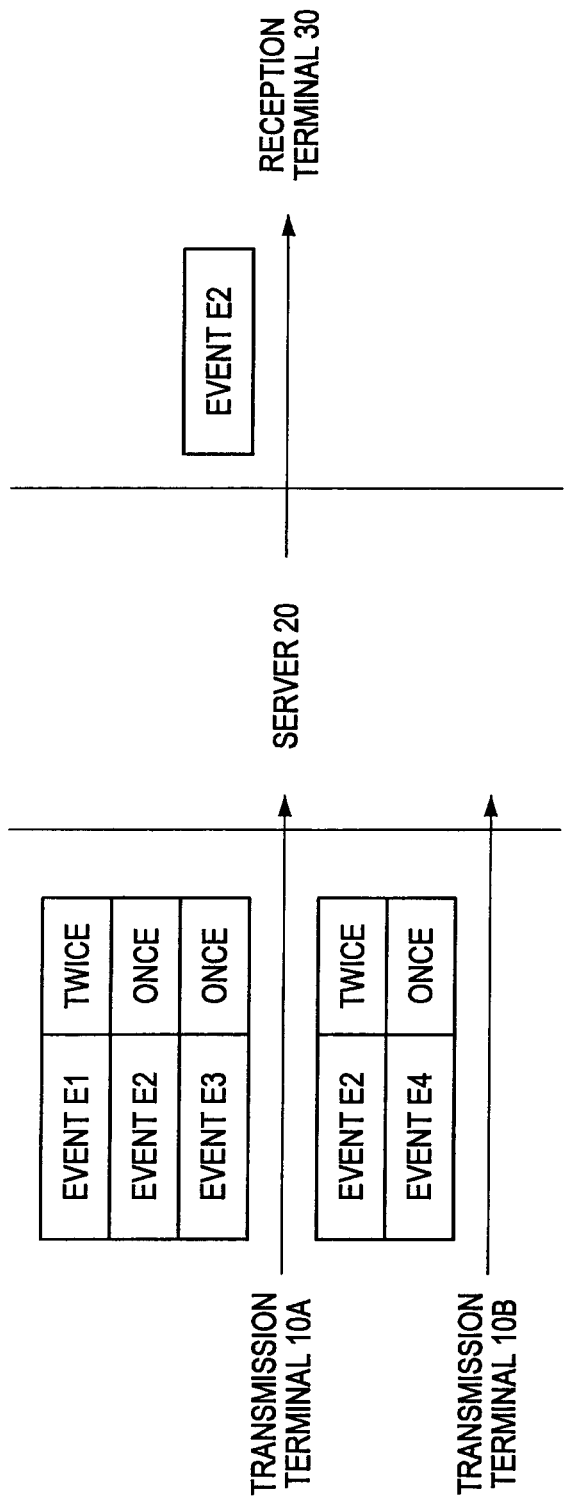
FIG. 10 is a diagram illustrating another example of processing executed by the server according to the embodiment.

FIG. 10 is a diagram illustrating another example of processing executed by the server according to the embodiment of the present disclosure. As shown in FIG. 10, there is also assumed the case where the notification of pieces of event identification information (events E1, E2, and E3) and the number of event occurrences associated with the respective pieces of event identification information is performed by the transmission terminal 10A serving as an example of the transmission terminal 10, and the notification of pieces of event identification information (events E2 and E4) and the number of event occurrences associated with the respective pieces of event identification information is performed by the transmission terminal 10B serving as an example of the transmission terminal 10. The number of event occurrences corresponds to the number of occurrence times within a predetermined time period, for example. In this case, the processing section 222 can perform predetermined statistical processing to the combinations acquired from each of the transmission terminal 10A and the transmission terminal 10B, and the notification section 223 can notify the reception terminal 30 of the result obtained by the predetermined statistical processing.

In the example shown in FIG. 10, the processing section 222 adds up the numbers of event occurrences acquired from each of the transmission terminal 10A and the transmission terminal 10B for each pieces of event identification information, and notifies the reception terminal 30 of the event identification information associated with the largest total number of event occurrences among the total numbers of event occurrences each obtained as a result of the addition. However, the statistical processing is not particularly limited. For example, the processing section 222 may notify the reception terminal 30 of the event identification information associated with total number of event occurrences which exceeds a predetermined number of times. In order to reduce the communication load on the transmission terminal 10, the server 20, and the reception terminal 30, the number of event occurrences can be transmitted from the transmission terminal 10 to the server 20 when the transmission terminal 10 accesses the server 20. For content data whose number of accesses is small, the statistical technique is particularly effective, because the real-time demand can be avoided.

In the case where it is difficult for the processing section 222 to process all of the events that occurred due to a large number of accesses from the transmission terminals 10 and the reception terminal 30, the processing section 222 may divide the transmission terminals 10 and the reception terminal 30 into a plurality of groups, and they may be synchronized within each group. Alternatively, the processing section 222 may select a representative transmission terminal 10, and may collect only an event occurred in the representative transmission terminal 10. There can be assumed various techniques for selecting the representative transmission terminal 10.

For example, let us assume a case where it is necessary to reduce the number of representative transmission terminals 10 to n or less. In this case, if there is a connection form a new transmission terminal 10 when the number of representative transmission terminals 10 is less than n, the processing section 222 can add the new transmission terminal 10 to the representative transmission terminal 10. Further, the processing section 222 may add randomly a transmission terminal 10, which is not a representative, as the representative transmission terminal 10 at the ratio of n/(total number of transmission terminals 10).

Further, the transmission terminal 10 which is determined to have a large number of transmissions may autonomously become the representative transmission terminal 10. The reference value used for determining whether the number of transmissions is large may be the value statistically determined by the server 20. Further, the processing section 222 may select n transmission terminals 10, n being the number of transmission terminals 10 with latest access, as the representative transmission terminals 10.

4. FUNCTIONS OF RECEPTION TERMINAL

Figure 11:
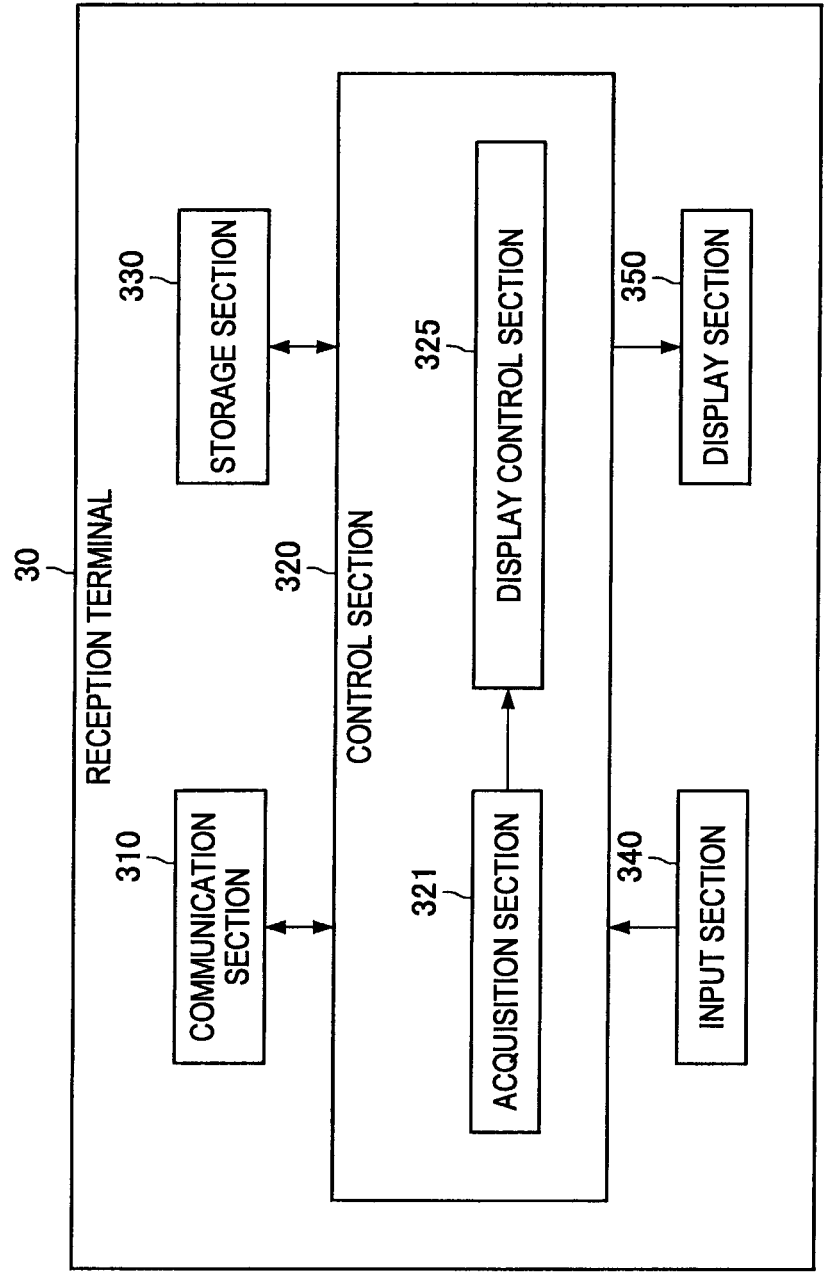
FIG. 11 is a block diagram showing a functional configuration of a reception terminal according to the embodiment.

Subsequently, functions of the reception terminal 30 according to the embodiment of the present disclosure will be described. FIG. 11 is a block diagram showing a functional configuration of the reception terminal 30 according to the embodiment of the present disclosure. As shown in FIG. 11, the reception terminal 30 according to the embodiment of the present disclosure includes a communication section 310, a control section 320, a storage section 330, an input section 340, and a display section 350.

The communication section 310 has a function of communicating with the transmission terminal 10 and the server 20 via the network 40. The communication section 310 can function as a reception section which receives, from the server 20, event identification information for identifying an event occurred in the transmission terminal 10 regarding content data shared between the transmission terminal 10 and the reception terminal 30.

The control section 320 is configured from, for example, a CPU (Central Processing Unit), a ROM (Read Only Memory), and a RAM (Random Access Memory), and has a function of controlling an entire operation of the reception terminal 30. The control section 320 includes an acquisition section 321 and a display control section 325.

The acquisition section 321 acquires content data to be shared with the transmission terminal 10. For example, the acquisition section 321 can acquire the content data received by the communication section 310 from the server 20 or a device other than the server 20, for example. For example, the content data is acquired by the acquisition section 321 based on a URL (Uniform Resource Locator) or the like which is input by the user using the input section 340, the input being accepted.

The acquisition section 321 can acquire the content data C1 as shown in FIG. 3, for example. Further, for example, control information is acquired by the acquisition section 321 based on an address embedded in the content data C1.

Figure 12:
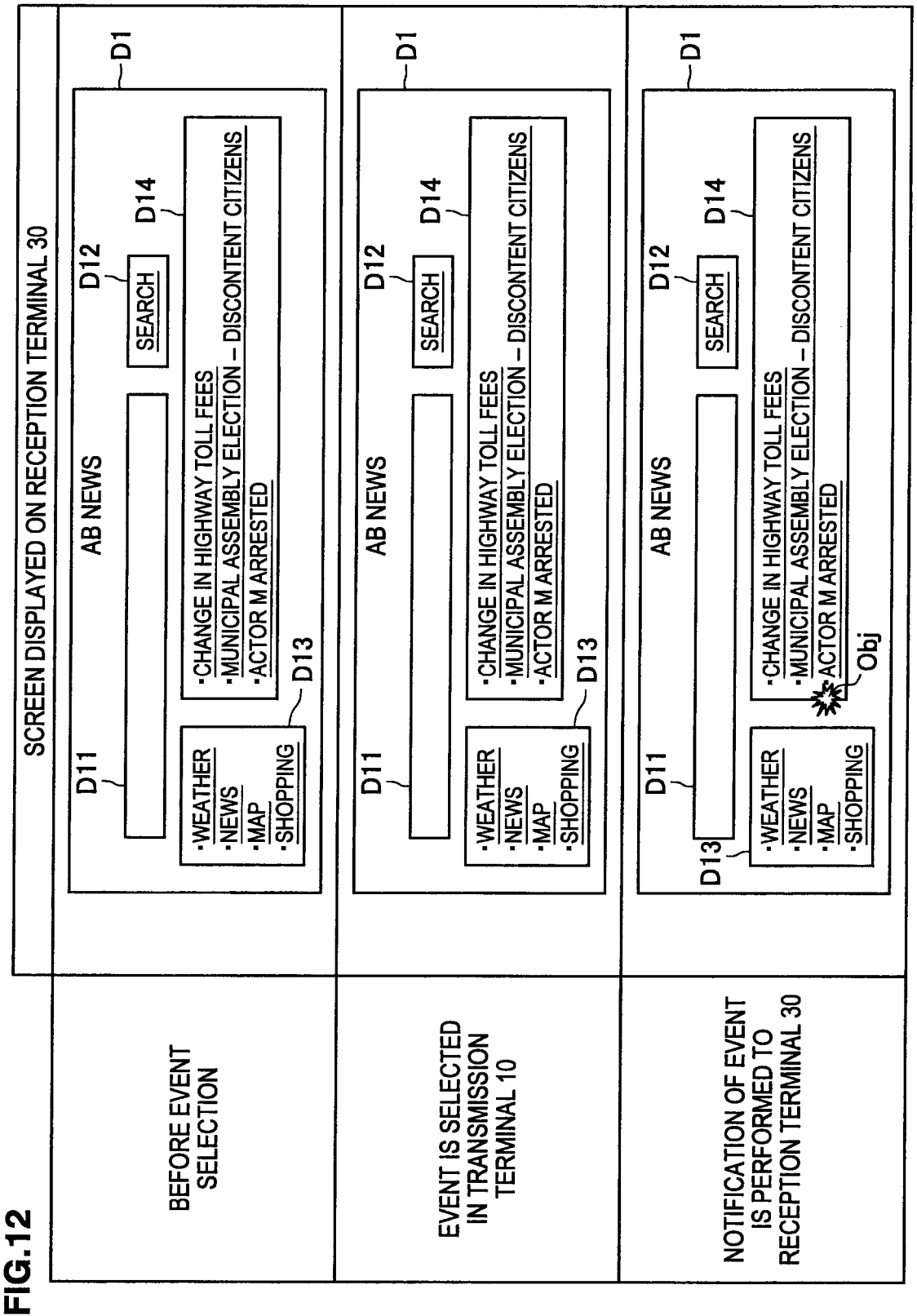
FIG. 12 is a diagram showing an example of a screen displayed by the reception terminal according to the embodiment.

The display control section 325 performs control of displaying content data shared with the transmission terminal 10. FIG. 12 is a diagram showing an example of a screen displayed by the reception terminal 30 according to the embodiment of the present disclosure. In the example shown in FIG. 12, the content data C1 is displayed as a screen D1 on the display section 350 by the control performed by the display control section 325, "before event selection". The screen D1 includes a text area D11, a search button D12, a link group D13, a link group D14, and the like.

When an event is selected by a user of the transmission terminal 10, a transition event to content data having a name of "Actor M arrested" is selected in the transmission terminal 10. As shown in FIG. 12, the transition event to the content data having the name of "Actor M arrested" is selected in the transmission terminal 10, and the occurrence of the transition event to the content data is detected.

When the acquisition section 321 of the reception terminal 30 acquires, from the server 20, event identification information for identifying the event occurred in the transmission terminal 10, the display control section 325 adds a display associated with the event identification information acquired by the acquisition section 321 to the content data. In the example shown in FIG. 12, as the display associated with the event identification information acquired by the acquisition section 321, an object Obj is added thereto.

When the acquisition section 321 transmits an event notification request to the server 20, the acquisition section 321 can acquire the event identification information as a response to the event notification request. The timing at which the event notification request is transmitted by the acquisition section 321 to the server 20 is not particularly limited, and may be transmitted every predetermined time period, for example.

The reception terminal 30 may further acquire event occurrence time, which is time at which an event occurred, from the server 20. In more detail, the acquisition section 321 further acquires the event occurrence time from the server 20, and the display control section 325 adds the display associated with the event identification information at the time corresponding to the event occurrence time acquired by the acquisition section 321 to the content data. The time to be a reference to the event occurrence time is not limited.

Note that, in the example shown in FIG. 12, an object Obj is displayed in the vicinity of the link selected in the transmission terminal 10, but is not limited to such an example. For example, the display control section 325 may change a style such as the font color, the background color, the border, or the like of the element selected in the transmission terminal 10. Further, the display control section 325 may display an image or animation in the vicinity of the element selected by the transmission terminal 10, which indicates that the element is selected.

In this way, the display control section 325 adds a display associated with the event identification information acquired by the acquisition section 321 to the content data, and thus, the user of the reception terminal 30 can grasp what operation the user of the transmission terminal 10 is performing.

Note that the event identification information acquired by the acquisition section 321 may be event identification information for identifying an event occurred in the transmission terminal 10, or may be a result obtained by performing statistical processing to the event occurred in the transmission terminal 10. The display control section 325 may add a display associated with any one of them to the content data, or may add displays associated with both of them to the content data. Further, the display control section 325 may change the display according to frequency of selections. For example, the display control section 325 can display, in a light color, the display associated with event identification information having a relatively low frequency of selections.

Further, there are assumed various events as the events to be selected, in addition to the link selection. For example, in the case where an event of content data-loading is selected in the transmission terminal 10, the display control section 325 may display the number of accesses to the content data at one side of the screen. Alternatively, at the moment a new transmission terminal 10 established a connection, the display control section 325 may display text or animation indicating that the connection is established. Further, the display control section 325 may display a map on the screen and may display in a flashing manner a place at which login is performed or the vicinity thereof.

Further, for example, in the case where an event of returning to a previous page is selected in the transmission terminal 10, the display control section 325 may add to the screen animation indicating that another user is going out of the content data. Further, for example, in the case where cursor movement is selected in the transmission terminal 10, the display control section 325 may display the cursor in a light color at the same position as the position of the cursor displayed in the transmission terminal 10.

Further, for example, in the case where screen scrolling is selected in the transmission terminal 10, the display control section 325 may give color to the scroll bar corresponding to the page which is being read by the user of the transmission terminal 10. In any technique, it is desirable that the event in the transmission terminal 10 is displayed as auxiliary information that does not have influence on viewing of the content data. That is, it is desirable to use the one that does not cause a large change to the screen of the reception terminal 30.

Note that, for example, in the case of accessing content data whose display contents are frequently changed, when attempting to execute the event identified by the event identification information provided to the reception terminal 30 from the transmission terminal 10 via the server 20, there is a case where an event different from the event executed in the transmission terminal 10 is executed in the reception terminal 30. For example, there is assumed a case where, although attempting to execute the transition event to the content data having the name of "Actor M arrested" in the reception terminal 30, a transition event to new content data is executed.

As a measure to prevent such a case, there is assumed a case where an identifier (id) is added to each of the event elements, the identifiers (id's) of the respective event elements being different from each other. Further, in the case where it is difficult to add a consistent identifier (id) to each event element (or in the case where the consistent identifier (id) is not added), the following control can be also performed: a hash value is generated from a specific attribute that each event has, and sharing is not performed when the hash values are not equal to each other.

Figure 13:
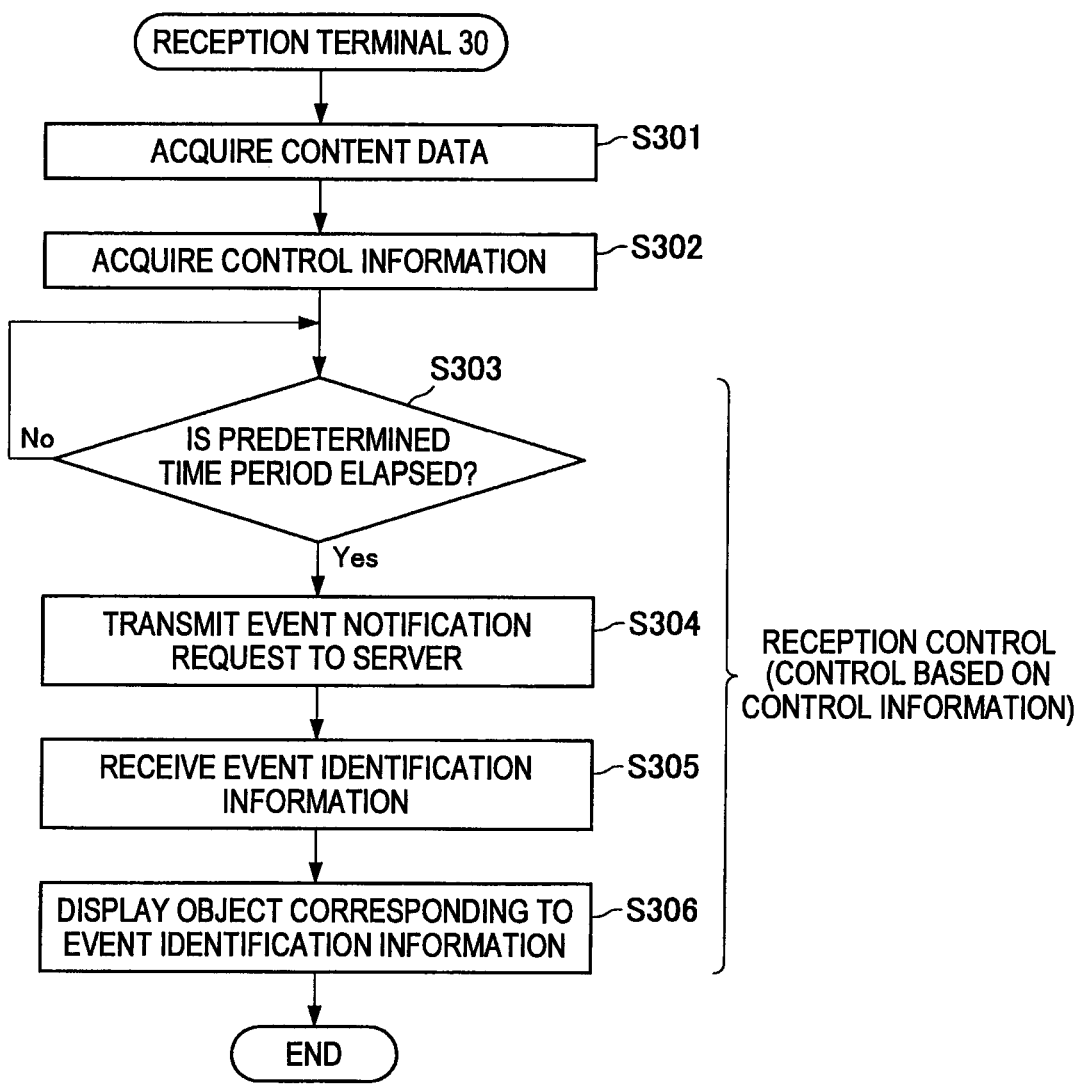
FIG. 13 is a flowchart showing a flow of operation performed by the reception terminal according to the embodiment.

Subsequently, a flow of operation performed by the reception terminal 30 according to the embodiment of the present disclosure will be described. FIG. 13 is a flowchart showing a flow of operation performed by the reception terminal 30 according to the embodiment of the present disclosure. As shown in FIG. 13, first, the acquisition section 321 acquires content data (Step S301), and acquires control information (Step S302).

In the case where a predetermined time period elapses ("Yes" in Step S303), the acquisition section 321 transmits an event notification request to the server 20 (Step S304), and receives as a response thereof event identification information from the server 20 (Step S305). For example, the display control section 325 displays the object corresponding to the event identification information (Step S306). In the case where the predetermined time period does not elapse ("No" in Step S303), the processing returns to Step S303. Steps S303 to Step S306 are executed based on the above-mentioned control information, for example.

5. EXAMPLE OF HARDWARE CONFIGURATION

Figure 14:
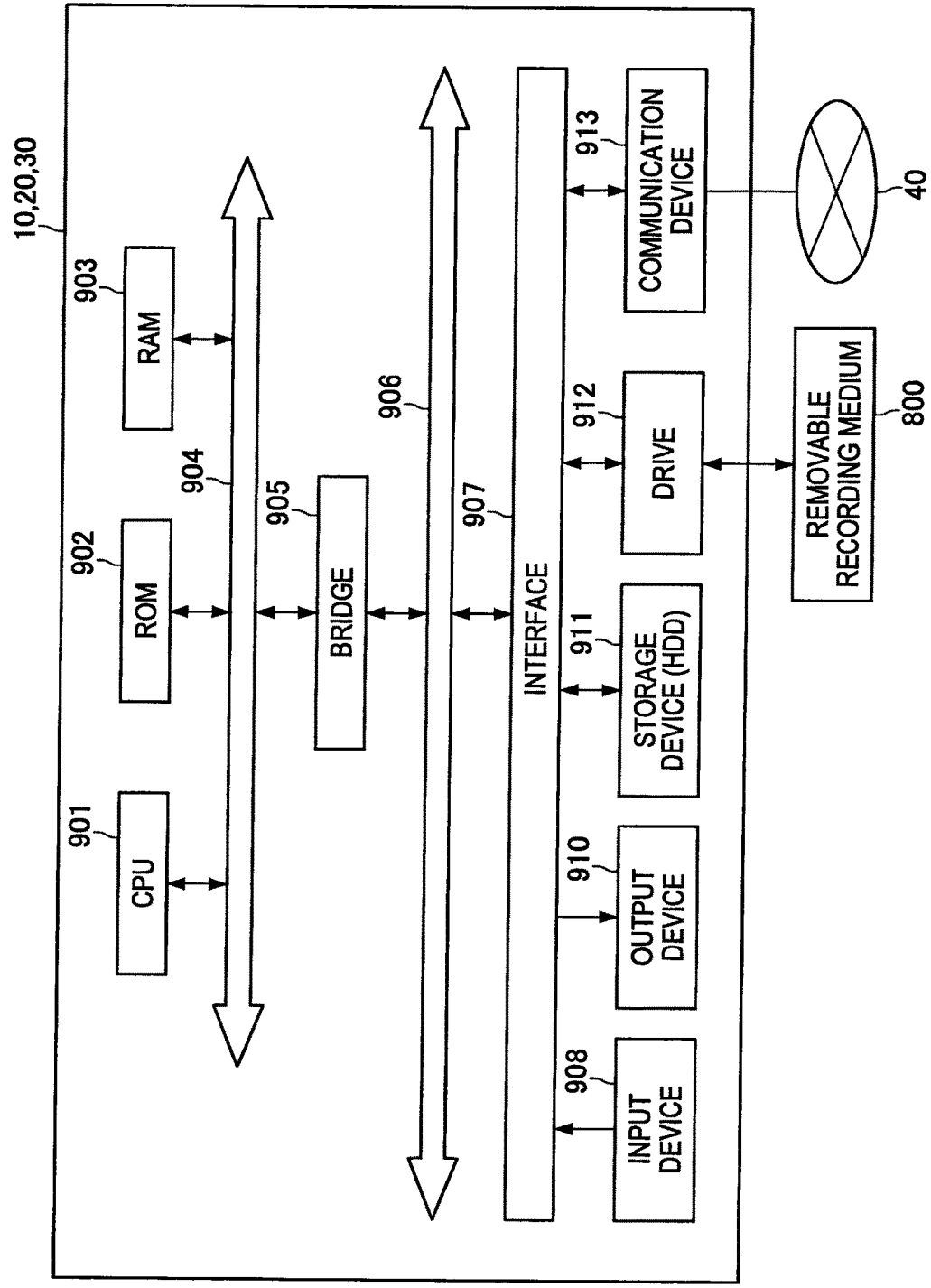
FIG. 14 is a block diagram showing a hardware configuration of an information processing apparatus according to the embodiment.

FIG. 14 is a block diagram showing a hardware configuration of an information processing apparatus (transmission terminal 10, server 20, and reception terminal 30) according to the embodiment of the present disclosure. The information processing apparatus includes a CPU 901, a ROM 902, a RAM 903, and a host bus 904. Further, the information processing apparatus includes a bridge 905, an external bus 906, an interface 907, an input device 908, an output device 910, a storage device (HDD) 911, a drive 912, and a communication device 913.

The CPU 901 functions as an arithmetic processing unit and a control unit, and controls entire operation of the information processing apparatus in accordance with various programs. Further, the CPU 901 may be a microprocessor. The ROM 902 stores a program, a calculation parameter, and the like used by the CPU 901. The RAM 903 temporarily stores a program used in execution of the CPU 901, a parameter varying as appropriate during the execution, and the like. They are connected with each other via the host bus 904 configured from a CPU bus or the like.

The host bus 904 is connected to the external bus 906 such as a PCI (Peripheral Component Interconnect/Interface) bus via the bridge 905. Note that it is not necessary that the host bus 904, the bridge 905, and the external bus 906 be configured separately, and the functions thereof may be implemented in one bus.

The input device 908 is configured from, for example, a device for inputting information by a user, such as a mouse, a keyboard, a touch panel, a button, a microphone, a switch, and a lever, and an input control circuit which generates an input signal based on the input by the user and outputs the generated input signal to the CPU 901. The user of the information processing apparatus can input various kinds of data to the information processing apparatus and can instruct the information processing apparatus to perform a processing operation by operating the input device 908.

The output device 910 includes, for example, display devices such as a CRT (Cathode Ray Tube) display device, a liquid crystal display (LCD) device, an OLED (Organic Light Emitting Diode) device, and a lamp. In addition, the output device 910 includes an audio output device such as a speaker and headphones. The output device 910 outputs reproduced content. More specifically, the display device displays various types of information such as the reproduced video data in the form of texts or images. On the other hand, the audio output device converts reproduced audio data and the like into audio, and outputs the audio.

The storage device 911 is a device for storing data configured as an example of a storage section of the information processing apparatus according to the present embodiment. The storage device 911 may include, for example, a storage medium, a recording device for recording data in the storage medium, a reading device for reading out the data from the storage medium, and a deletion device for deleting the data recorded in the storage medium. The storage device 911 is configured from an HDD (Hard Disk Drive), for example. The storage device 911 drives a hard disk and stores a program and various data executed by the CPU 901.

The drive 912 is a reader/writer for the storage medium and is built in or externally attached to the information processing apparatus. The drive 912 reads out information recorded in a removable recording medium 800 which is mounted thereto, such as a magnetic disk, an optical disc, a magneto-optical disk, or a semiconductor memory, and outputs the information to the RAM 903. Further, the drive 912 can also write information on the removable recording medium 800.

The communication device 913 is a communication interface which is configured from, for example, a communication device for establishing a connection with a communication network 40. The communication device 913 may be a wireless LAN (Local Area Network) enabled communication device, an LTE (Long Term Evolution) enabled communication device, or a wired communication device for performing wired communication.

6. CONCLUSION

As described above, according to the embodiment of the present disclosure, under the case where content data is being shared between multiple terminals, it is possible to notify another terminal of an event occurred in one terminal. In this way, it becomes possible to notify another user viewing the content data of what operation one user is performing to the content data.

It should be understood by those skilled in the art that various modifications, combinations, sub-combinations and alterations may occur depending on design requirements and other factors insofar as they are within the scope of the appended claims or the equivalents thereof.

Further, respective steps included in the operations of the transmission terminal 10, the server 20, and the reception terminal 30 of the present specification are not necessarily processed in chronological order in accordance with the flowcharts. For example, the respective steps included in the operations of the transmission terminal 10, the server 20, and the reception terminal 30 may be processed in different order from the flowcharts, or may be processed in a parallel manner.

Further, it is also possible to create a computer program for causing hardware such as the CPU 901, the ROM 902, and the RAM 903, which are built in the information processing apparatus, to exhibit equivalent functions as those of respective structures of the information processing apparatus described above. Further, there is also provided a storage medium having the computer program stored therein.

Additionally, the present technology may also be configured as below.

(1) A reception terminal including:

a display control section which performs control of displaying content data shared with a transmission terminal; and an acquisition section which acquires, from a server, event identification information for identifying an event occurred in the transmission terminal regarding the content data, wherein the display control section adds a display associated with the event identification information acquired by the acquisition section to the content data.

(2) The reception terminal according to (1), wherein the acquisition section further acquires event occurrence time, which is time at which the event occurred, from the server, and wherein the display control section adds the display associated with the event identification information to the content data at time corresponding to the event occurrence time.

(3) An information processing method including:

performing control of displaying content data shared with a transmission terminal;

acquiring, from a server, event identification information for identifying an event occurred in the transmission terminal regarding the content data; and adding a display associated with the event identification information to the content data.

(4) A program for causing a computer to function as a reception terminal including a display control section which performs control of displaying content data shared with a transmission terminal, and an acquisition section which acquires, from a server, event identification information for identifying an event occurred in the transmission terminal regarding the content data, wherein the display control section adds a display associated with the event identification information acquired by the acquisition section to the content data.

(5) A server including:

an acquisition section which acquires, from a transmission terminal, event identification information for identifying an event occurred in the transmission terminal regarding content data shared between the transmission terminal and a reception terminal; and a notification section which notifies the reception terminal of the event identification information acquired by the acquisition section in response to a request from the reception terminal.

(6) The server according to (5), wherein the acquisition section further acquires event occurrence time, which is time at which the event occurred, from the transmission terminal, and wherein the notification section further notifies the reception terminal of the event occurrence time acquired by the acquisition section.

(7) The server according to (6), wherein the acquisition section acquires a combination of the event identification information and the event occurrence time from each of a plurality of the transmission terminals, wherein the server further includes a processing section which merges the combinations acquired from the respective plurality of transmission terminals, and wherein the notification section notifies the reception terminal of a result obtained by the merging performed by the processing section.

(8) The server according to (6), wherein the acquisition section acquires a combination of the event identification information and the event occurrence time from each of a plurality of the transmission terminals, wherein the server further includes a processing section which performs predetermined statistical processing to the combinations acquired from the respective plurality of transmission terminals, and wherein the notification section notifies the reception terminal of a result obtained by performing, by the processing section, the predetermined statistical processing.

(9) An information processing method including:

acquiring, from a transmission terminal, event identification information for identifying an event occurred in the transmission terminal regarding content data shared between the transmission terminal and a reception terminal; and notifying the reception terminal of the event identification information in response to a request from the reception terminal.

(10) A program for causing a computer to function as a server including an acquisition section which acquires, from a transmission terminal, event identification information for identifying an event occurred in the transmission terminal regarding content data shared between the transmission terminal and a reception terminal, and a notification section which notifies the reception terminal of the event identification information acquired by the acquisition section in response to a request from the reception terminal.

(11) A transmission terminal including:

a display control section which performs control of displaying content data shared with a reception terminal;

a detection section which detects an event that occurred regarding the content data; and a notification section which notifies a server of event identification information for identifying the event detected by the detection section.

(12) The transmission terminal according to (11), wherein the detection section further detects event occurrence time, which is time at which the event occurred, and wherein the notification section further notifies the server of the event occurrence time detected by the detection section.

(13) The transmission terminal according to (11) or (12), wherein the detection section further detects whether to limit the notification of information related to the detected event with respect to the reception terminal, and wherein, when the detection section determines that the notification of the information related to the event is to be limited with respect to the reception terminal, the notification section limits the notification of the information related to the event with respect to the server.

(14) An information processing method including:

performing control of displaying content data shared with a reception terminal;

detecting an event that occurred regarding the content data; and notifying a server of event identification information for identifying the event.

(15) A program for causing a computer to function as a transmission terminal including a display control section which performs control of displaying content data shared with a reception terminal, a detection section which detects an event that occurred regarding the content data, and a notification section which notifies a server of event identification information for identifying the event detected by the detection section.

(16) An information processing system including:

a transmission terminal including a display control section which performs control of displaying content data, a detection section which detects an event that occurred regarding the content data, and a notification section which performs notification of event identification information for identifying the event detected by the detection section;

a server including an acquisition section which acquires the event identification information from the transmission terminal, and a notification section which performs notification of the event identification information acquired by the acquisition section in response to a request; and a reception terminal including a display control section which performs control of displaying content data shared with the transmission terminal, and an acquisition section which acquires the event identification information from the server, wherein the display control section adds a display associated with the event identification information acquired by the acquisition section to the content data.

The present disclosure contains subject matter related to that disclosed in Japanese Priority Patent Application JP 2011-113397 filed in the Japan Patent Office on May 20, 2011, the entire content of which is hereby incorporated by reference.

What is claimed is:

1. A reception terminal comprising:
    circuitry configured to:
        perform control of displaying content data shared with a transmission terminal;
        acquire, from a server, a combination of event identification information for identifying operations performed by one or more users upon the content data from each of a plurality of transmission terminals, and event occurrence time which is a time at which the operations occurred;
        acquire, from the server, notification of a result of performing a predetermined statistical processing to the combinations of the event identification information and the event occurrence time acquired from the plurality of transmission terminals; and
        add a display associated with the result of performing the predetermined statistical processing to the content data,
    wherein the predetermined statistical processing includes selecting a representative transmission terminal from the plurality of transmission terminals,
    wherein the circuitry is further configured to select the representative transmission terminal having a highest amount of transmission from the plurality of transmission terminals, and
    wherein the circuitry is further configured to only acquire event identification information from the representative transmission terminal.

2. An information processing method, executed via at least one processor having circuitry, the method comprising:
    performing control of displaying content data shared with a transmission terminal;
    acquiring, from a server, a combination of event identification information for identifying operations performed by one or more users upon the content data from each of a plurality of transmission terminals, and event occurrence time which is a time at which the operations occurred;
    acquiring, from the server, notification of a result of performing a predetermined statistical processing to the combinations of the event identification information and the event occurrence time acquired from the plurality of transmission terminals; and
    adding a display associated with the result of performing the predetermined statistical processing to the content data,
    wherein the predetermined statistical processing includes selecting a representative transmission terminal from the plurality of transmission terminals,
    wherein the predetermined statistical processing includes selecting the representative transmission terminal having a highest amount of transmission from the plurality of transmission terminals, and
    wherein the event identification information is only acquired from the representative transmission terminal.

3. A non-transitory computer-readable storage medium having embodied thereon a program, which when executed by a computer having circuitry, causes the computer to execute a method, the method comprising:
    performing control of displaying content data shared with a transmission terminal;
    acquiring, from a server, a combination of event identification information for identifying operations performed by one or more users upon the content data from each of a plurality of transmission terminals, and event occurrence time which is a time at which the operations occurred;
    acquiring, from the server, notification of a result of performing a predetermined statistical processing to the combinations of the event identification information and the event occurrence time acquired from the plurality of transmission terminals; and
    adding a display associated with the result of performing the predetermined statistical processing to the content data,
    wherein the predetermined statistical processing includes selecting a representative transmission terminal from the plurality of transmission terminals,
    wherein the predetermined statistical processing includes selecting the representative transmission terminal having a highest amount of transmission from the plurality of transmission terminals, and
    wherein the event identification information is only acquired from the representative transmission terminal.

4. A server comprising:
    circuitry configured to:
        acquire, from each of a plurality of transmission terminals, a combination of event identification information for identifying operations performed by one or more users upon content data, wherein the content data is shared between respective ones of the plurality of transmission terminals and respective ones of a plurality of reception terminals, and event occurrence time which is a time at which the operations occurred;
        perform a predetermined statistical processing to the combinations of the event identification information and the event occurrence time acquired from the plurality of transmission terminals; and
        notify a designated one of the reception terminals of a result of performing the predetermined statistical processing in response to a request from the designated one of the reception terminals, wherein the predetermined statistical processing includes selecting a representative transmission terminal from the plurality of transmission terminals,
wherein the circuitry is further configured to select the representative transmission terminal having a highest amount of transmission from the plurality of transmission terminals, and
wherein the circuitry is further configured to only acquire event identification information from the representative transmission terminal.

5. The server according to claim 4,
wherein the circuitry is further configured to:
merge the combinations acquired from the plurality of transmission terminals, and notify the designated one of reception terminals of a result obtained by the merging.

6. An information processing method, executed via at least one processor having circuitry, the method comprising:
acquiring, from each of a plurality of transmission terminals, a combination of event identification information for identifying operations performed by one or more users upon content data, wherein the content data is shared between respective ones of the plurality of transmission terminals and respective ones of a plurality of reception terminals, and event occurrence time which is a time at which the operations occurred;
performing a predetermined statistical processing to the combinations of the event identification information and the event occurrence time acquired from the plurality of transmission terminals; and
notifying a designated one of the reception terminals of a result of performing the predetermined statistical processing in response to a request from the designated one of the reception terminals,
wherein the predetermined statistical processing includes selecting a representative transmission terminal from the plurality of transmission terminals,
wherein the predetermined statistical processing includes selecting the representative transmission terminal having a highest amount of transmission from the plurality of transmission terminals, and
wherein the event identification information is only acquired from the representative transmission terminal.

7. A non-transitory computer-readable storage medium having embodied thereon a program, which when executed by a computer having circuitry, causes the computer to execute a method, the method comprising:
acquiring, from each of a plurality of transmission terminals, a combination of event identification information for identifying operations performed by one or more users upon content data, wherein the content data is shared between respective ones of the plurality of transmission terminals and respective ones of a plurality of reception terminals, and event occurrence time which is a time at which the operations occurred;
performing a predetermined statistical processing to the combinations of the event identification information and the event occurrence time acquired from the plurality of transmission terminals; and
notifying a designated one of the reception terminals of a result of performing the predetermined statistical processing in response to a request from the designated one of the reception terminals,
wherein the predetermined statistical processing includes selecting a representative transmission terminal from the plurality of transmission terminals,
wherein the predetermined statistical processing includes selecting the representative transmission terminal having a highest amount of transmission from the plurality of transmission terminals, and
wherein the circuitry is further configured to only acquire event identification information from the representative transmission terminal.

8. A transmission terminal comprising:
circuitry configured to:
perform control of displaying content data shared with a reception terminal;
detect a combination of operations performed by one or more users upon the content data and event occurrence time, which is a time at which the operations occurred;
detect a result of a predetermined statistical processing performed to the combination of the operations and the event occurrence time; and
notify a server of the result of performing the predetermined statistical processing,
wherein the predetermined statistical processing includes selecting a representative transmission terminal from a plurality of transmission terminals, selecting the representative transmission terminal having a highest amount of transmission from the plurality of transmission terminal, and event identification information is only acquired from the representative transmission terminal.

9. An information processing method, executed via at least one processor having circuitry, the method comprising:
performing control of displaying content data shared with a reception terminal;
detecting a combination of operations performed by one or more users upon the content data and event occurrence time, which is a time at which the operations occurred;
performing predetermined statistical processing to the combination of the operations and the event occurrence time; and
notifying a server of a result obtained by the performance of the predetermined statistical processing,
wherein the predetermined statistical processing includes selecting a representative transmission terminal from a plurality of transmission terminals, selecting the representative transmission terminal having a highest amount of transmission from the plurality of transmission terminals, and event identification information is only acquired from the representative transmission terminal.

10. A non-transitory computer-readable storage medium having embodied thereon a program, which when executed by a computer having circuitry, causes the computer to execute a method, the method comprising:
performing control of displaying content data shared with a reception terminal;
detecting a combination of operations performed by one of more users upon the content data and event occurrence time, which is a time at which the operations occurred;
performing predetermined statistical processing to the combination of the operations and the event occurrence time; and
notifying a server of a result obtained by the performance of the predetermined statistical processing,
wherein the predetermined statistical processing includes selecting a representative transmission terminal from a plurality of transmission terminals, selecting the representative transmission terminal having a highest amount of transmission from the plurality of transmission terminals, and event identification information is only acquired from the representative transmission terminal.

11. The reception terminal according to claim 1, wherein the circuitry is further configured to:
   detect whether to limit the notification;
   determine that the notification is to be limited; and
   limit the notification.

12. The reception terminal according to claim 1, wherein the predetermined statistical processing includes calculating an occurrence associated with each of the event identification information and selecting the event identification information that has a highest associated occurrence as the result.

13. The reception terminal according to claim 1, wherein the circuitry is further configured to:
   add a new transmission terminal as the representative transmission terminal when a number of the plurality of transmission terminals is less than a predetermined number.

14. The reception terminal according to claim 1, wherein the circuitry is further configured to:
   select more than one transmission terminal from the plurality of transmission terminals as the representative transmission terminal.

15. The reception terminal according to claim 12, wherein the predetermined statistical processing includes selecting event identification information associated with occurrences which exceed a predetermined number.

16. The reception terminal according to claim 1, wherein the circuitry is further configured to:
   select transmission terminals with latest access from the plurality of transmission terminals.

* * * * *